United States Patent [19]

Baker et al.

[11] 4,189,196
[45] Feb. 19, 1980

[54] STAGING CABINET AND TRAY COMBINATION

[75] Inventors: Edward D. Baker, San Francisco; Nils Lang-Ree, Los Altos, both of Calif.

[73] Assignee: NPI Corporation, Burlingame, Calif.

[21] Appl. No.: 914,358

[22] Filed: Jun. 12, 1978

[51] Int. Cl.² .................... A47B 77/08; F25B 29/00
[52] U.S. Cl. ............................... 312/236; 312/209; 312/239; 165/48 R
[58] Field of Search .................. 312/236, 209, 239; 165/48, 42

[56] References Cited

U.S. PATENT DOCUMENTS

| | | | |
|---|---|---|---|
| 1,754,518 | 4/1930 | Kinnie | 312/236 |
| 2,574,950 | 11/1951 | Ben-Ami Ben-Dor | 312/236 |
| 3,222,114 | 12/1965 | Stentz | 312/236 |
| 3,834,778 | 9/1974 | Morrison et al. | 312/209 |
| 3,851,940 | 12/1974 | Relyea et al. | 312/209 |
| 3,876,268 | 4/1975 | Colver | 312/209 |
| 3,982,584 | 9/1976 | Spandudis | 312/236 |
| 4,026,351 | 5/1977 | Biava | 312/236 |
| 4,093,041 | 6/1978 | Davis et al. | 312/236 |

FOREIGN PATENT DOCUMENTS 950480  2/1964  United Kingdom ............... 312/236

*Primary Examiner*—Victor N. Sakran
*Attorney, Agent, or Firm*—Lothrop & West

[57] ABSTRACT

A staging cabinet and tray combination especially for use with hamburger buns has an open front cabinet including solid metallic top, bottom, back and side walls abutting each other at right angles and having a plurality of horizontal ledges secured to the side walls at selected vertical intervals, the ledges on one side wall being at the same height as the corresponding ledges on the other side wall. Cooperating with the ledges are trays each supportable at a selected height in the cabinet by a pair of the ledges. Each tray includes a rectangular metallic sheet having downturned flanges along opposite side edges of the sheet, the flanges being slidable on the ledges and being bottom notched to reduce heat transfer and allow air flow. The rectangular sheet itself has ribs along the transverse front and rear edges, each rib having an inner wall upstanding from the sheet and then having an outer wall extending downwardly from the inner wall far enough to afford a gripping portion. The sheet also has upstanding from its upper surface a plurality of grouped bosses for supporting buns, each of the bosses preferably having a central perforation. The entire arrangement is designed to permit free circulation of temperature equalizing air and to minimize heat transfer from one portion to the other of the metallic assembly.

1 Claim, 4 Drawing Figures

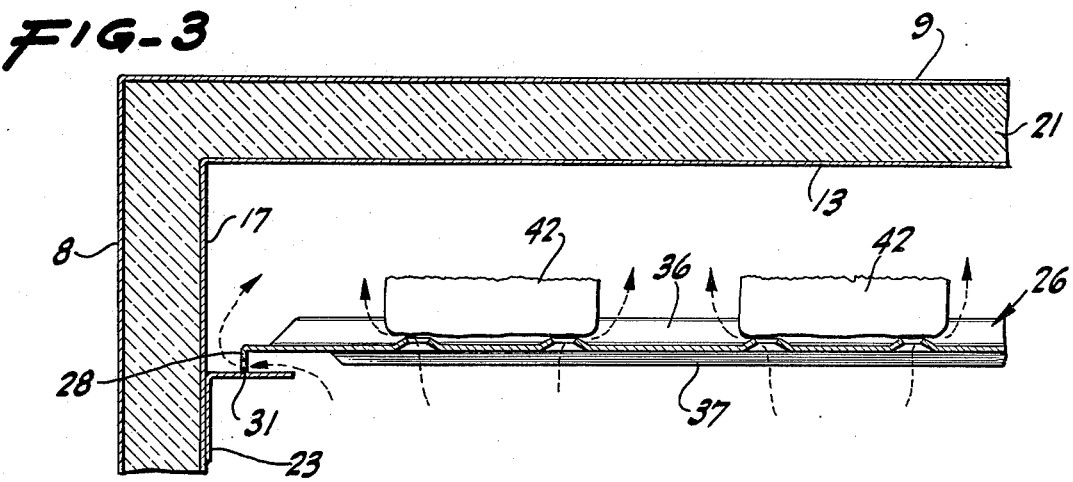
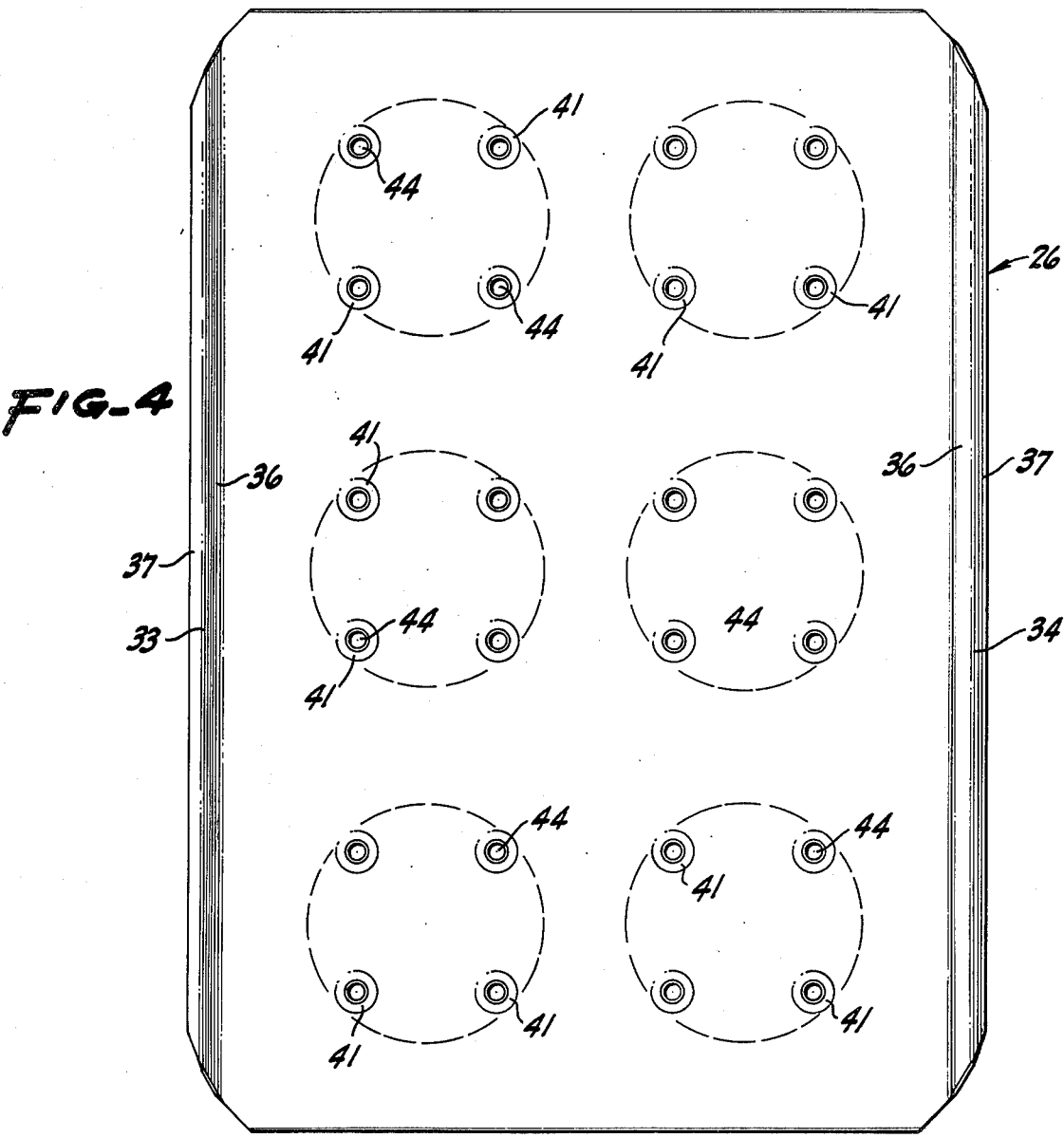

STAGING CABINET AND TRAY COMBINATION

BRIEF SUMMARY OF THE INVENTION

It is often necessary to maintain buns, particularly hamburger buns, in cut condition; that is, divided into crowns and heels, in various environments either adjacent hot mechanisms or cold mechanisms and preferably in such a way that the buns maintain a fairly standard condition for some time prior to use while keeping the bun portions readily available for quick use. The preferred material for such cabinets due to sanitary, easy-care and other reasons is metal sheet, which is a good thermal conductor. The present staging cabinet and tray combination provides a partial enclosure for the buns for housing a number of superposed trays, each of the trays being reduced in points of contact so as not to transfer heat easily through the metal from one portion of the cabinet to the other, and each tray affording a relatively stiff though light sheet capable of supporting a bun portion spaced away largely from the metal and in a position affording ready air circulation for uniform temperature, the arrangement also having the attributes of easy inspection and cleaning and ready nesting or stacking of the various trays or shelves.

Although the staging cabinet and tray combination can be embodied in a widely different number of ways, depending particularly upon the environment of use, it is often the case the precise environment of use is not known in advance and that only the type of buns to be carried is reasonably well settled. The drawings, therefore, are arranged as an example.

BRIEF DESCRIPTION OF THE SEVERAL VIEWS OF THE DRAWINGS

FIG. 3 is a cross-section similar to FIG. 2, but the plane of section being indicated by the line 3—3 of FIG. 2.

FIG. 4 is a plan to an enlarged scale of a tray as illustrated in the preceding figures, the view being on a plane indicated by the line 4—4 of FIG. 2.

DETAILED DESCRIPTION

Figure 1:
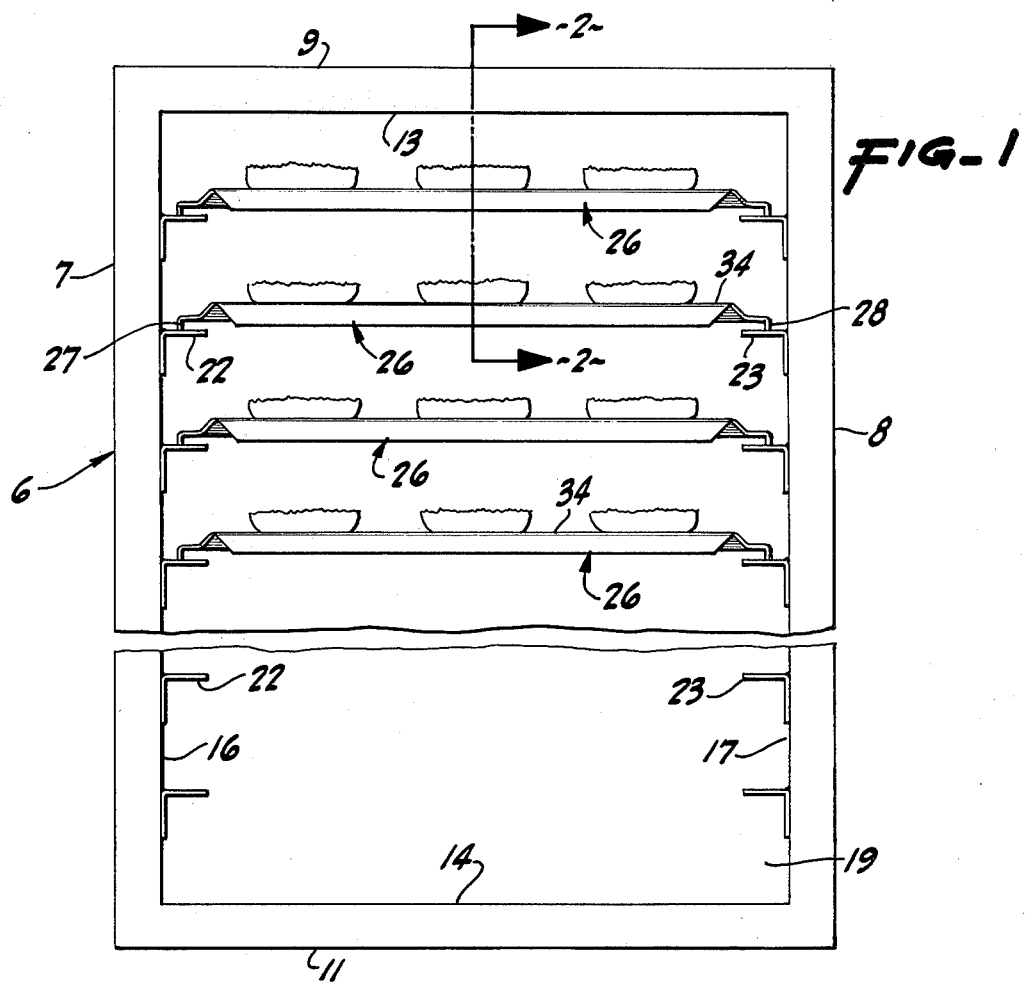
FIG. 1 is a front elevation, a portion being broken away, of a staging cabinet and trays constructed pursuant to the invention, some of the trays being omitted.

In an exemplary environment, the present staging cabinet and tray combination is designed to be appropriately stationed in a commercial hamburger cooking restaurant to make available in the vicinity of the broiling area an adequate supply of ready buns. Depending upon the particular installation, the staging cabinet may be located alongside a broiler or might be located alongside a refrigerator or may even be in a less drastic thermal neighborhood, but in every case is intended to keep or store buns in an even, appropriate fashion despite an unfavorable or thermally spotty environment.

For this reason, there is provided a cabinet 6 of generally rectangular form and constructed in a double-walled fashion. The cabinet is conveniently fabricated of metal since it is sturdy, relatively inexpensive and easy to keep sanitary, although it is not advantageous from the thermal standpoint. Even so, the cabinet has a pair of exterior side walls 7 and 8, an exterior top wall 9 and an exterior bottom wall 11 as well as an exterior rear wall 12.

Spaced within these walls is an interior top wall 13, an interior bottom wall 14, a pair of interior side walls 16 and 17 and an interior back wall 18. The various walls are spaced from each other substantially uniformly and define a generally rectangular front opening 19 (FIG. 2) affording ready access to the interior compartment 20. The space between the various walls can be evacuated permanently for thermal insulation, or preferably is provided with an insulating filling 21 to inhibit heat transfer to and from the interior of the cabinet.

Array on the interior side walls 16 and 17 at appropriately chosen intervals and preferably at the same levels are horizontal ledges 22, 23 and the like. Each ledge is conveniently a sheet metal angle welded to the respective side wall and extending for most of the distance between the front and the back of the compartment.

Particularly designed to cooperate with the various ledges is a plurality of trays. The trays are preferably all alike, so that a description of one applies equally to the others. Each tray is fabricated of a sheet 26 of relatively thin metal generally of initially planar configuration and at the two sides thereof having downturned flanges 27 and 28. The flanges are not continuous from end to end, but rather along their bottom edges 29 are periodically interrupted by scallops 31 or the like to afford air holes through the flanges and so that the metal-to-metal contact between the flanges and the ledges such as 22 or 23 is substantially interrupted.

In addition, each of the trays along its transverse front edge and its transverse rear edge is provided with ribs 33 and 34 parallel to each other and at right angles to the edges 29, the ribs upstanding from the general plane of the plate 26 in an upwardly and outwardly inclined inner wall 36. Each inner wall then curves over smoothly and extends into a downwardly disposed outer wall 37 thus forming in cross-section an inverted U-shape and adding stiffness transversely. The outer walls 37 extend downwardly but not as far as the edges 29.

More particularly, each of the planar plates 26 is likewise afforded a plurality of regularly arranged, upwardly extending bosses 41. These are so disposed with respect to each other as to serve as button-like supports for a superposed bun heel 42 or bun crown 43 in such a fashion that there are only minute points of contact between the bun portions and the metal.

In addition, and in order to afford good air circulation, each of the bosses is pierced by a central perforation 44. By this means, not only is there good support for the buns and good circulation of the air around them, but they are also well engaged for holding in position on the bosses as the trays are manipulated.

In the use of the device, the cabinet is preferably placed in as favorable a location as possible, although it may be subject to undue heat radiation or conduction especially in a localized portion. Even so, there is very little conduction through the cabinet walls, so little chance for a localized hot spot or cold spot due to conduction through the metal. There is good temperature equalization due to air circulation through the open front of the cabinet and through the various openings within the cabinet.

Figure 2:
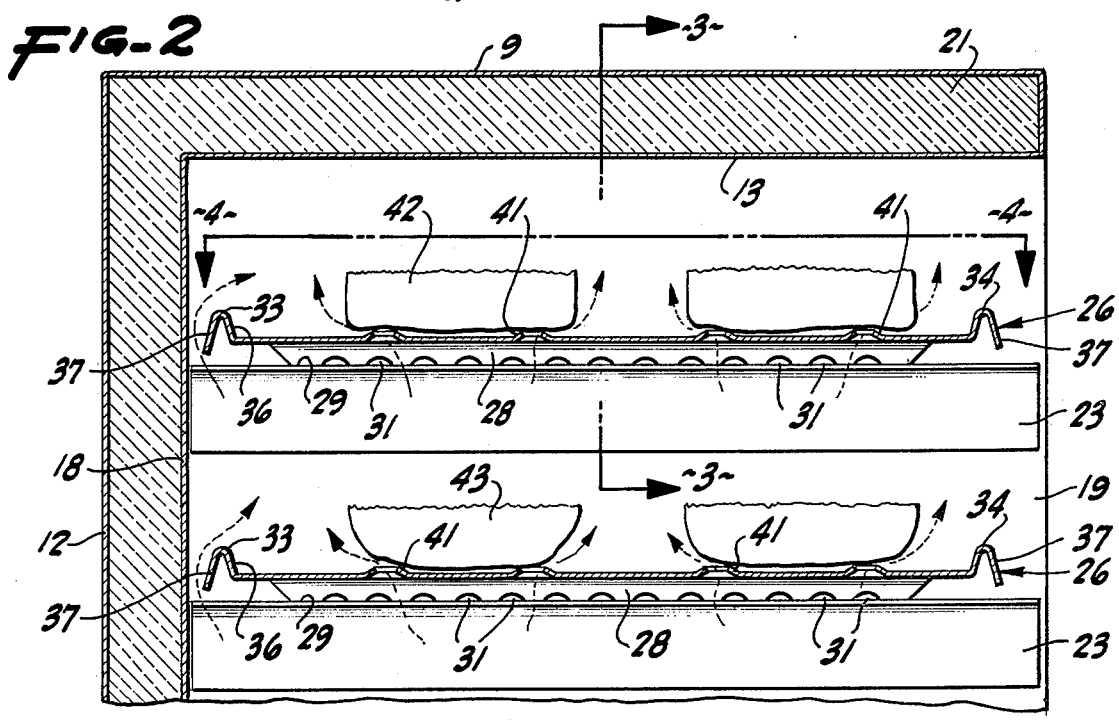
FIG. 2 is a cross-section, the plane of section being indicated by the line 2—2 of FIG. 1, and showing to an enlarged scale a portion of the upper structure illustrated in FIG. 1.

The buns are put on the trays, usually, before the trays are put into the cabinet, and the trays are then slid into position approximately as shown in FIG. 1, with the tray sides spaced from the sides of the cabinet, and, as shown in FIG. 2, with the trays spaced from the rear wall of the cabinet as well. About the only contact then between the metal of the trays and of the cabinet is through the scalloped bottoms of the ledges. This is minor.

When buns are to be retrieved for use, the user can hook his fingers under the depending, outer wall portion 37 of the tray front and can withdraw the tray from its position on the ledges. That is easily done since the scallops tend to assist the sliding operation. The buns are then lifted from the trays, which can be restored to use. With this arrangement, a number of buns are stored in a compact fashion, and their temperature is maintained reasonably well due to the very effective and almost entirely complete circulation of air in and around the zone within which the buns are stored and due to the absence of metallic hot spots or cold spots.

After the mechanism has been in use for some time, it can be emptied or when emptied can be easily sterilized and cleaned for reuse.

We claim:

1. A staging cabinet and tray combination comprising an open-front cabinet including solid top, bottom, back and side walls abutting each other at right angles; a plurality of horizontal ledges secured to said side walls at selected vertical intervals, each of said ledges on one side wall being at the same height as and being directed toward a corresponding one of said ledges on the other side wall; and a plurality of metal trays each being supportable at a selected height in said cabinet on a pair of said ledges, each of said trays including a generally planar, rectangular metal sheet having longitudinally extending, stiffening and supporting downturned side flanges along opposite side edges of said sheet and slidable on said ledges, said side flanges being repetitively bottom-notched all along their bottom edges to leave only small contact areas with said ledges and said rectangular sheet having transversely extending, inverted U-shaped stiffening end ribs along the front and rear edges thereof, each of said end ribs having an inner wall upstanding from said sheet and an outer wall extending downwardly from the top of said inner wall, means upstanding from said sheet defining upwardly extending, button-like bosses disposed in groups to support individual bun portions, and means defining perforations in the tops of said bosses for air circulation therethrough and for edge engagement with said bun portions.

* * * * *